United States Patent
Pretzel et al.

(10) Patent No.: US 11,387,477 B2
(45) Date of Patent: Jul. 12, 2022

(54) METHOD FOR THE PRODUCTION OF A MEMBRANE ELECTRODE ASSEMBLY FOR A FUEL CELL

(71) Applicant: cellcentric GmbH & Co. KG, Kirchheim unter Teck (DE)

(72) Inventors: Leoni Pretzel, Fellbach (DE); Christian Zoeller, Stuttgart (DE); Johannes Deutsch, Fellbach (DE); Volker Horinek, Fellbach (DE); Nico Riede, Kornwestheim (DE); Karl Zimmerer, Stuttgart (DE)

(73) Assignee: cellcentric GmbH & Co. KG, Kirchheim unter Teck (DE)

( * ) Notice: Subject to any disclaimer, the term of this patent is extended or adjusted under 35 U.S.C. 154(b) by 134 days.

(21) Appl. No.: 15/751,392

(22) PCT Filed: Jul. 21, 2016

(86) PCT No.: PCT/EP2016/001272
§ 371 (c)(1),
(2) Date: Feb. 8, 2018

(87) PCT Pub. No.: WO2017/025170
PCT Pub. Date: Feb. 16, 2017

(65) Prior Publication Data
US 2018/0233759 A1    Aug. 16, 2018

(30) Foreign Application Priority Data
Aug. 11, 2015   (DE) .................... 10 2015 010 422.5

(51) Int. Cl.
*H01M 8/1004* (2016.01)
*H01M 8/00* (2016.01)
(Continued)

(52) U.S. Cl.
CPC .......... *H01M 8/1004* (2013.01); *H01M 8/00* (2013.01); *H01M 8/0273* (2013.01); *H01M 2008/1095* (2013.01); *Y02P 70/50* (2015.11)

(58) Field of Classification Search
CPC ....... H01M 2008/1095; H01M 8/1004; H01M 8/00; H01M 8/0273; Y02P 70/50
See application file for complete search history.

(56) References Cited

U.S. PATENT DOCUMENTS 6,500,217 B1 * 12/2002 Starz ..................... B41M 3/006
29/623.5
7,569,082 B2   8/2009 Valentine et al.
(Continued)

FOREIGN PATENT DOCUMENTS

CN      1853301 A     10/2006
CN    101036256 A      9/2007
(Continued)

OTHER PUBLICATIONS

PCT/EP2016/001272, International Search Report (PCT/ISA/220 and PCT/ISA/210) dated Sep. 15, 2016, with partial English translation (Four (4) pages).
(Continued)

*Primary Examiner* — Mayla Gonzalez Ramos
(74) *Attorney, Agent, or Firm* — Crowell & Moring LLP

(57) ABSTRACT

A method for providing a catalyst-coated polymer electrolyte membrane for a membrane electrode assembly of a fuel cell with at least one functional coating made of a material includes printing directly the material onto the catalyst-coated polymer electrolyte membrane by a non-contact printing method.

3 Claims, 2 Drawing Sheets

(51) Int. Cl.
*H01M 8/10* (2016.01)
*H01M 8/0273* (2016.01)

(56) References Cited

U.S. PATENT DOCUMENTS

| | | | |
|---|---|---|---|
| 8,343,321 B2 | 1/2013 | Zuber et al. | |
| 2003/0224233 A1 | 12/2003 | Kohler et al. | |
| 2004/0081749 A1* | 4/2004 | O'Brien | H01M 8/1004 427/58 |
| 2008/0038613 A1* | 2/2008 | Padberg | C08J 5/2256 29/831 |
| 2012/0321988 A1* | 12/2012 | Sharman | H01M 8/1004 429/480 |
| 2012/0321995 A1* | 12/2012 | Roof | H01M 4/8807 429/523 |
| 2013/0175168 A1* | 7/2013 | Nemes | G01N 27/4045 204/415 |
| 2014/0120457 A1 | 5/2014 | Choi et al. | |
| 2014/0287338 A1 | 9/2014 | Tanaka et al. | |
| 2015/0357656 A1* | 12/2015 | Farrington | H01M 8/1007 429/457 |
| 2018/0026273 A1* | 1/2018 | Okonogi | B05B 5/025 156/98 |

FOREIGN PATENT DOCUMENTS

| | | |
|---|---|---|
| CN | 102160221 A | 8/2011 |
| CN | 102842724 A | 12/2012 |
| CN | 103620840 A | 3/2014 |
| CN | 103858263 A | 6/2014 |
| CN | 104064785 A | 9/2014 |
| DE | 11 2005 002 440 B4 | 3/2009 |
| DE | 20 2009 007 702 U1 | 10/2009 |
| JP | 2013020753 A | 1/2013 |
| WO | WO 2004/017688 A1 | 2/2004 |
| WO | WO 2006/041677 A1 | 4/2006 |
| WO | WO 2007/088049 A1 | 8/2007 |
| WO | WO 2010/032099 A1 | 3/2010 |
| WO | WO 2013/064640 A1 | 5/2013 |
| WO | WO-2014111745 A2 * | 7/2014 .......... H01M 8/2465 |

OTHER PUBLICATIONS

Litster et al., "Review PEM Fuel Cell Electrodes", Journal of Power Sources, vol. 130, Dec. 31, 2004, pp. 61-76, XP002761359.

De-Chin Huang et al., "Effect of Dispersion Solvent in Catalyst Ink on Proton Exchange Membrane Fuel Cell Performance"; International Journal of Electrochemical Science, vol. 6, Jul. 1, 2011, pp. 2551-2565, XP002761360.

Chinese Office Action issued in Chinese application No. 201680044953.5 dated Jun. 2, 2020, with partial English translation (Fourteen (14) pages).

Chinese Office Action issued in Chinese application No. 201680044953.5 dated Mar. 26, 2021, with partial English translation (Thirteen (13) pages).

Chinese-language Office Action issued in Chinese Application No. 201680044953.5 dated Nov. 3, 2021 with English translation (12 pages).

Chinese-language Office Action issued in Chinese Application No. 201680044953.5 dated Feb. 22, 2022 with English translation (27 pages).

* cited by examiner

METHOD FOR THE PRODUCTION OF A MEMBRANE ELECTRODE ASSEMBLY FOR A FUEL CELL

BACKGROUND AND SUMMARY OF THE INVENTION

The invention relates to a method for the production of a membrane electrode assembly for a fuel cell.

Fuel cells of so-called polymer electrolyte membrane fuel cells—PEMFC for short—are already well known from the general prior art. Such a PEMFC comprises at least one membrane electrode assembly—MEA for short—which is made up of an anode, a cathode and a polymer electrolyte membrane (also ionomer membrane)—REM for short—arranged therebetween. The MEA is arranged in turn between two separator plates, wherein one of the separator plates has channels for the distribution of fuel and the other separator plate has channels for the distribution of oxidant, and wherein the channels face towards the MEA. The anode and the cathode are electrodes which are usually formed as gas diffusion electrodes—GDE for short. They have the function of dissipating the electricity generated during the electrochemical reaction (for example $2H2+O2 \rightarrow 2H2O$) and allowing the reactants, educts and products to diffuse through. Here, a GDE can comprise at least one gas diffusion coating or gas diffusion layer—GDL for short. Typically, a catalyst coating is applied to the GDL to thereby produce the GDE, wherein the catalyst coating faces towards the PEM. The GDE produced in this way can subsequently be joined to a second GDE and, arranged therebetween, to a PEM by hot pressing, for example, to form an MEA.

In addition, DE 11 2005 002 440 B4 discloses a method for the production of a modular electrode assembly for a polyelectrolyte membrane, wherein a gas diffusion medium is provided. Furthermore, a membrane electrode assembly is provided which comprises an ionomer membrane coated with catalyst coatings on opposite sides. Adhesive is printed onto the gas diffusion medium. The gas diffusion medium is arranged relative to the membrane electrode assembly, and adhesive is printed on the gas diffusion medium on one of the catalyst coatings of the membrane electrode assembly.

The object of the present invention is to create a method by means of which a particularly advantageous production of a membrane electrode assembly for a fuel cell can be achieved.

A first aspect of the invention relates to a method for the production of a membrane electrode assembly for a fuel cell, in particular a polymer electrolyte membrane fuel cell. In the method, a catalyst-coated polymer electrolyte membrane of the membrane electrode assembly is provided with at least one functional coating made of a material, by the material being printed directly onto the catalyst-coated polymer electrolyte membrane by means of a non-contact printing method. The non-contact printing method is understood to mean that a printing element such as a print head, for example, by means of which the material is printed directly onto the catalyst-coated polymer electrolyte membrane, does not touch the catalyst-coated polymer electrolyte membrane, but rather is arranged at a distance from the catalyst-coated polymer electrolyte membrane, for example.

By means of the printing element, the material from which the functional coating is produced is applied to the catalyst-coated polymer electrolyte membrane. For example, the material is sprayed onto the catalyst-coated polymer electrolyte membrane without the printing element touching the catalyst-coated polymer electrolyte membrane.

By using a non-contact printing method, damage to the catalyst-coated polymer electrolyte membrane can be avoided. Furthermore, it is possible to provide the polymer electrolyte membrane with the at least one functional coating, such that a particularly advantageous production of the membrane electrode assembly and thus of the fuel cell as a whole can be achieved.

This makes it possible to create degrees of freedom in the design of the membrane electrode assembly (MEA). In particular, it is possible to achieve a continuous production of the MEA, wherein the functional coating does not have to be printed onto a gas diffusion layer (GDL), but rather the functional coating can be advantageously printed onto the catalyst-coated polymer electrolyte membrane. During the production of the MEA, the catalyst-coated polymer electrolyte membrane (CCM) is located, for example, on a base web, wherein the base web and/or the CCM is provided, for example, as continuous material or web material and is at least substantially continuously moved or conveyed in a conveying direction during the continuous production of the MEA. During this conveying, the at least one functional coating can be printed onto the CCM, such that the production of the MEA can be particularly time- and cost-effective.

During the continuous production of the MFA, the GDL is, for example, dispensed by means of a dispensing module. Since it is provided according to the invention to print the at least one functional coating directly onto the CCM and not onto the GDL, the dispensing module can be greatly simplified. Furthermore, it is possible by means of the method according to the invention to apply functional coatings to the CCM without damaging them, in particular their catalyst coating. By printing the functional coating onto the CCM, a saving function of the dispensing module can be achieved, wherein such a saving function is not possible with an integrated screen printing unit.

The non-contact printing method is to be understood, for example, as so-called non-impact printing (NIP). This is a printing method that does not require a solid printing form such as a printing cylinder or a stamp, for example. It has proven particularly advantageous for the non-contact printing method to be carried out in the manner of an inkjet printing method. Such an inkjet printing method is also referred to as ink-jet, wherein the material is applied to, in particular spayed onto, the CCM without contact, for example. Here, the material is applied to the CCM, for example, in droplet form. In other words, for example, droplets made of the material are emitted from the printing element, wherein these droplets are scattered or brought onto the CCM, thereby providing the CCM with the material and thus with the functional coating.

Furthermore, it has proven to be particularly advantageous if the non-contact printing method is carried out as digital printing. This is to be understood as a printing method in which a printed image, according to which the functional coating is printed onto the CCM, is transferred directly from a computer to a printing machine for printing the functional coating onto the CCM without using a static printing form.

The material is, for example, an adhesive which is printed directly onto the CCM as part of the method. As a result, it is possible, for example, to connect the CCM to at least one further component, in particular a gas diffusion layer (CDL), of the membrane electrode assembly (MEA) by means of the functional coatings produced from the adhesive.

Alternatively or in addition, it is conceivable that a catalyst material is used as the material, from which the catalyst coating of the CCM is produced. In other words, the CCM is a membrane coated with a catalyst or a catalyst material. If, for example, defective points of the catalyst of the CCM are detected, catalyst or catalyst material can be reprinted by means of the method according to the invention, by printing catalyst material directly onto the CCM at the defective points. As a result, the defective points are provided with the printed catalyst material, whereby the defective points are eliminated. As a result, an at least substantially continuous catalyst coating of the CCM can be achieved such that it has a particularly advantageous function in the finished MEA.

A second aspect of the invention relates to a method for the production of a membrane electrode assembly for a fuel cell, wherein a frame material is provided which forms a frame of the membrane electrode assembly which can be used in the fuel cell. Here, the frame encompasses an active region of the membrane electrode assembly. Furthermore, at least one partial region of the frame material is provided with a functional coating made of a material, by the material being printed directly onto the frame material. Advantageous embodiments of the first aspect of the invention are to be regarded as advantageous embodiments of the second aspect of the invention and vice versa.

In particular, a continuous and thus time- and cost-effective production of the membrane electrode assembly can be achieved by printing, since the functional coating can be printed directly onto the frame material. The frame material forms, for example, the aforementioned base web, wherein the material does not have to be printed onto a GDL or the CCM, but rather the material can be printed directly onto the frame material. As a result, the respective dispensing module of the CCM or the GDL can be kept particularly simple. Furthermore, functional coatings can be applied to the frame material without damaging it. In addition, degrees of freedom in the design of the membrane electrode assembly (MFA) can be created.

The active region of the membrane electrode assembly is one in which the reactions of the oxidant and the fuel take place. A support for a membrane, in particular the CCM, of the membrane-electrode assembly is provided by means of the frame. In addition, the frame in particular enables the attachment of sealing elements for sealing the membrane electrode assembly with respect to separator plates or bipolar plates. Furthermore, the frame material can be provided in a condition which enables particularly good passage through the various processing stations.

The frame material is preferably provided as a continuous material web which passes through a plurality of processing stations. As a result, an at least substantially continuous and thus cost-effective production of the MEA can be achieved.

Finally, it has been shown to be advantageous in the second aspect of the invention if the material is an adhesive, by means of which the frame material is connected to at least one second component, in particular the CCM and/or the GDL, of the membrane electrode assembly.

Further advantages, features and details of the invention arise from the following description of a preferred exemplary embodiment as well as with the aid of the drawings.

DETAILED DESCRIPTION OF THE DRAWINGS

Figure 1:
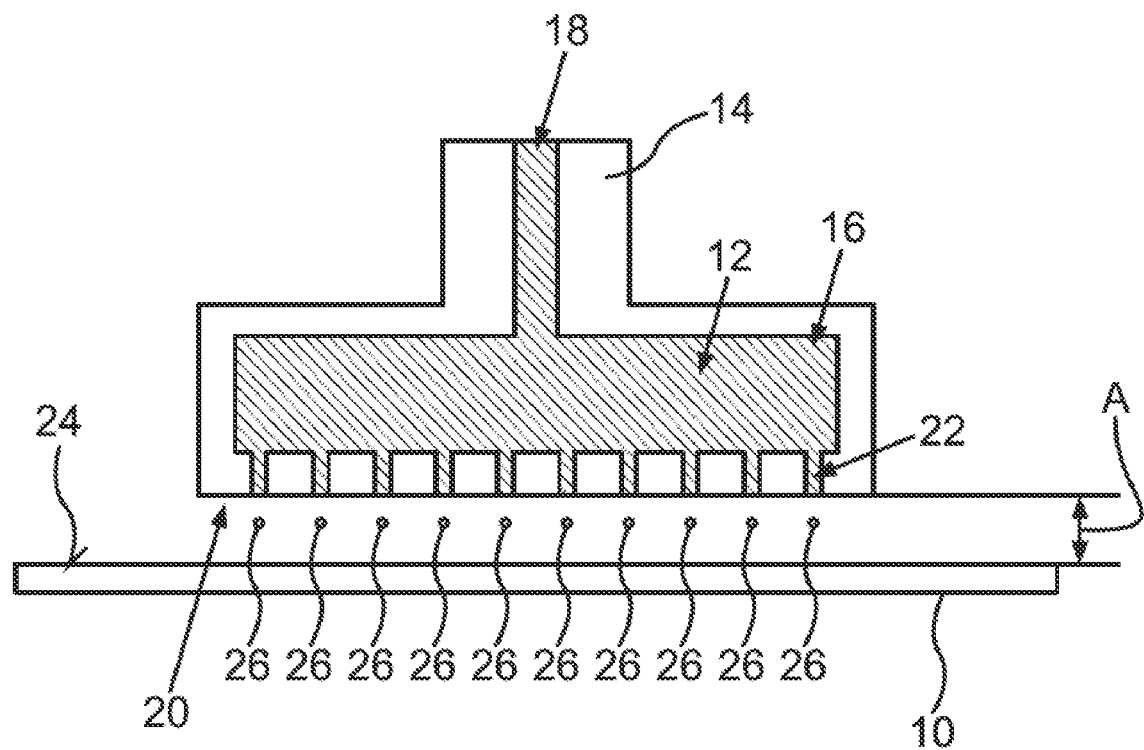
FIG. 1 is a schematic depiction of a device for providing a catalyst-coated polymer electrolyte membrane for a membrane electrode assembly of a fuel cell having at least one functional coating.

FIG. 1 shows a schematic depiction of a device for providing a catalyst-coated polymer electrolyte membrane 10 (CCM) for a membrane electrode assembly (MEA) of a fuel cell with at least one functional coating made of a material 12. Here, the fuel cell is formed as a polymer electrolyte membrane fuel cell (PEMFC) and is used, for example, in a fuel cell system of a motor vehicle, in particular a passenger motor vehicle, wherein the motor vehicle can be driven by means of the fuel cell system. The PEMFC comprises the aforementioned MEA which is made up of an anode, a cathode, and a polymer electrolyte membrane (PEM) arranged therebetween. The MEA is arranged in turn between two separator plates, wherein one of the separator plates has channels for the distribution of fuel and the other separator plate has channels for the distribution of oxidant, and wherein the channels face towards the MEA. The channels form a channel structure, a so-called flow field or current field.

The anode and the cathode are electrodes which are generally formed as gas diffusion electrodes (GDE). They have the function of dissipating the electricity generated during the electrochemical reaction (for example $2H_2 + O_2 \rightarrow 2H_2O$) and allowing the reducing agents, educts and products to diffuse through. A GDE can comprise at least one gas diffusion coating or gas diffusion layer (GDL). A catalyst coating is applied to a respective main surface of the PEM such that, for example, an anodic catalyst coating is applied to a first of the main surfaces and a cathodic catalyst coating is applied to a second of the main surfaces. The respective catalyst coating is formed from a catalyst material and is also referred to as a catalyst or acts as a catalyst. In this case, the PEM is added to the catalyst-coated polymer electrolyte membrane 10, since, in this case, we generally speak of a catalyst-coated membrane—CCM for short. In other words, the catalyst-coated polymer electrolyte membrane 10 is a membrane which is coated with at least one catalyst or catalyst coating.

The GDE may also have a gas distribution layer which is connected to the gas diffusion layer and which faces towards a separator plate in the PEMFC. The gas diffusion layer and the gas distribution layer mainly differ in their pore sizes and thus in the type of transport mechanism for a reactant (diffusion or distribution).

Such a fuel cell can create high-power electrical current at relatively low operating temperatures. Real fuel cells are usually stacked into so-called fuel stacks—stacks for short—in order to achieve a high power output, wherein bipolar separator plates, so-called bipolar plates, are used instead of the monopolar separator plates, and monopolar separator plates only form the two terminal ends of the stack. They are sometimes called end plates and may be considerably different from bipolar plates in terms of structure.

In order to achieve a particularly advantageous production of the MFA and thus of the fuel cell as a whole, the material 12 is printed directly onto the catalyst-coated polymer electrolyte membrane 10 by means of a non-contact printing method. For this purpose, the device is formed as a printing system or printing machine and comprises at least one print head 14 having a receiving space 16 for the material 12. Furthermore, the print head 14 has a supply line 18, via which the material 12, in particular in its liquid state, can be supplied to the receiving space 16. The print head 14 has a plurality of outlet openings 22, which function as nozzles or individual nozzles, on an underside 20 which faces towards the catalyst-coated polymer electrolyte membrane 10 during printing. The material 12 can be emitted from the receiving space 16 or from the print head 14 via these individual nozzles and thus applied, for example, to a surface 24 of the CCM (catalyst-coated polymer electrolyte membrane 10) which faces towards the underside 20 during printing. For example, the material 12, in particular in the liquid state, is emitted from the print head 14 via the individual nozzles at a predeterminable pressure, such that, in the present case, individual drops 26 are emitted from the print head 14 and are blasted onto the surface 24 or against the surface 24. The individual drops 26 made of the material 12 strike the surface 24 and thus the CCM and form the at least one functional coating on the surface 24.

The CCM is provided, for example, as continuous material or web material and is conveyed in a conveying direction, while the material 12 or the functional coating is printed onto the CCM. As a result, an at least substantially continuous production of the functional coating can be achieved, such that a particularly time- and cost-effective, at least substantially continuous production of the MEA can be carried out overall.

The non-contact printing method is understood to mean that the printing system in particular the print head 14, does not touch the CCM during printing. It can be seen from FIG. 1 that the print head 14 is arranged at a distance A from the surface 24 or from the CCM during printing. To produce the functional coating in a particularly precise manner, the distance preferably ranges from 0.5 to 2 millimeters inclusive. In other words, it is preferably provided that the print head 14, in particular its underside 20, is kept at a distance A from the CCM during printing, in particular from the surface 24, wherein this distance ranges from 0.5 to 2 millimeters inclusive.

The material 12 is, for example, the aforementioned catalyst material from which the catalyst coating of the CCM is formed. As a result, it is possible, for example, to improve or repair defective points detected in advance by means of targeted reprinting of catalyst material. In other words, catalyst material can be printed directly onto the CCM at the defective points in order to repair the defective points. Furthermore, it is conceivable that the material 12 is an adhesive, such that the functional coating is formed as an adhesive coating. By means of the functional coating formed as an adhesive coating, the CCM can then be connected, i.e., glued, to at least one further component of the MEA, for example to the GDL.

The non-contact printing method is preferably carried out in the manner of an inkjet printing method, and particularly preferably as digital printing. By using the non-contact printing method, damage to the CCM, in particular damage to the catalyst coating, can be avoided since the print head 14 does not touch the CCM.

Figure 2A:
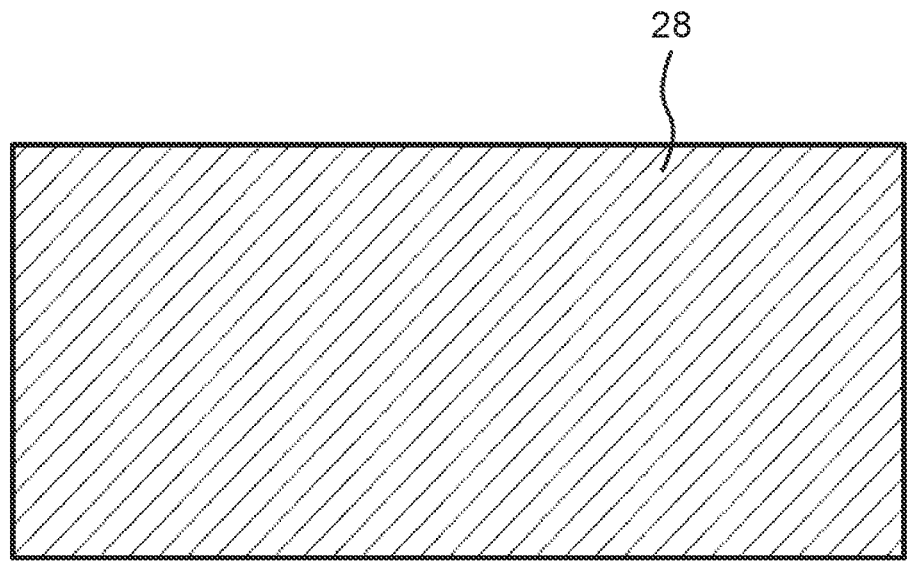
FIGS. 2a-c, in each case, are schematic top views of a component of the membrane electrode assembly during the production of the membrane electrode assembly.

A method for the production of the membrane electrode assembly is illustrated below with the aid of FIGS. 2 a-c. In the method, an initially full-surface frame material 28 is provided, which is shown in FIG. 2a. In particular, the frame material 28 is provided as continuous material, i.e., as a continuous material web, which is conveyed, for example, in a conveying direction and passes through a plurality of processing stations. The frame material 28 is thus a different, additional component of the MEA with respect to the CCM and the GDL. In the finished state, the frame material 28 forms a frame 30 which can be seen from FIGS. 2b and c and which encloses an active region of the membrane electrode assembly. This active region is formed, for example, by the CCM, in particular its catalyst coating.

Figure 2B:
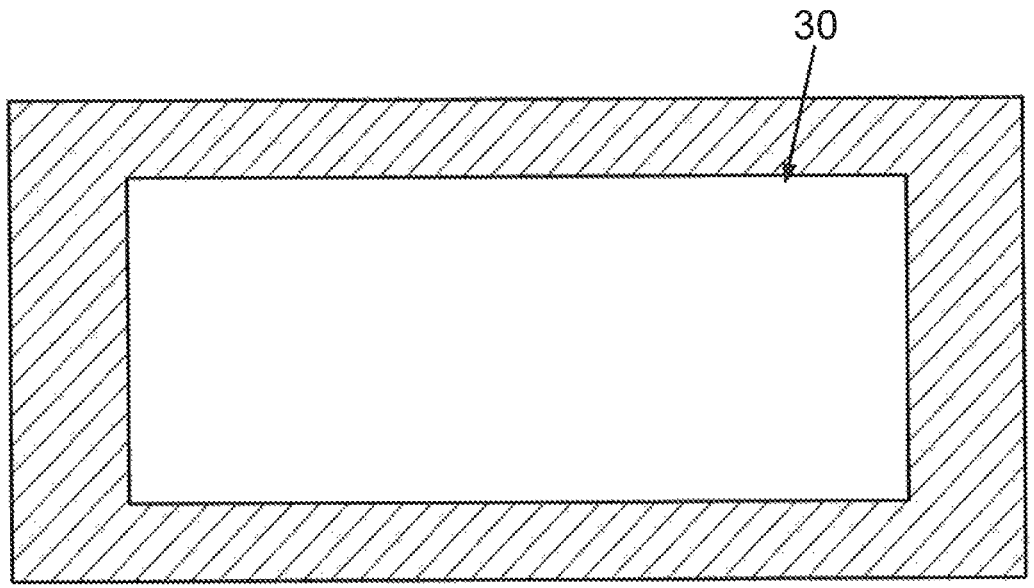
Figure 2C:
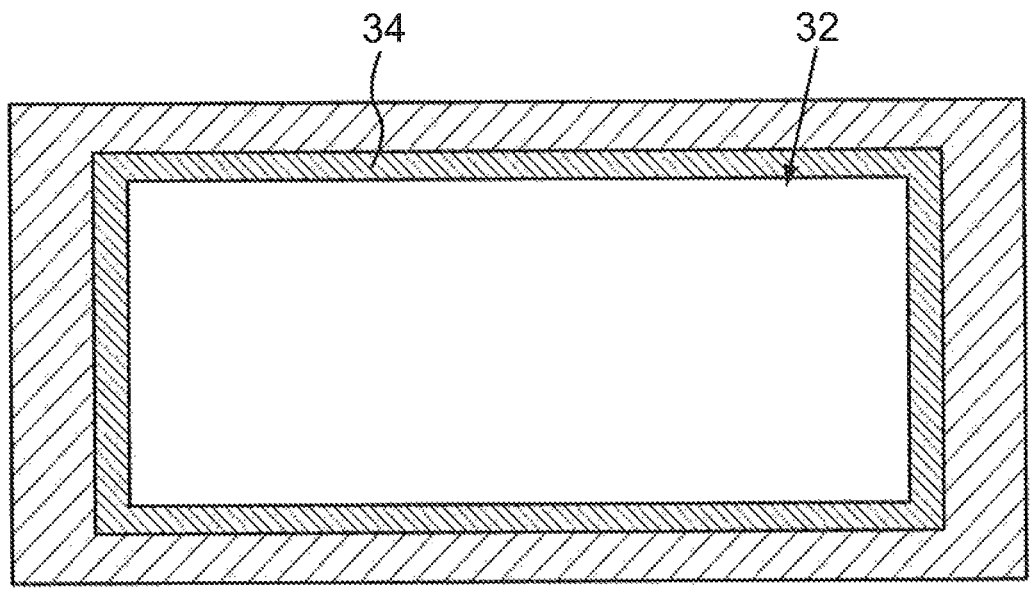

A region 32 is punched out of the full-surface frame material 28 in one of the work stations in order to produce the frame 30, as can be seen from FIGS. 2b and c. This region 32 is received in the finished membrane electrode assembly by the active region, in particular the CCM. It can be seen from FIG. 2c that at least one partial region of the frame material 28 is provided with a functional coating 34 made of a material, by the material being printed directly onto the frame material 28. In the present case, this partial region is an edge region of the frame 30 delimiting the stamped region 32. In the present case, the material is an adhesive, such that the functional coating 34 is formed as an adhesive coating. By means of the adhesive or the adhesive coating, the frame 30 is connected, i.e., glued, to a further component of the MEA, for example to the CCM and/or the GDL.

The adhesive is printed onto the frame material 28, for example, at a second processing station. For example, a dispensing of the CCM into the adhesive bed which is still moist takes place at a third processing station. It can be provided that the material for producing the functional coating 34 is printed directly onto the frame material 28 by means of a printing method, in particular a non-contact printing method. The printing method is, for example, a screen printing method or a batch printing method. For example, the printing method is carried out as continuous printing and/or rotary printing. The printing method comprises, for example, a release sheet transfer method and/or an ink-jet method and/or a flexographic printing method and/or a spray coating method.

By means of punching, for example, a recess, in particular a passage opening, of the frame material 28 is formed, wherein the recess or the passage opening is delimited by the aforementioned edge region. The material or adhesive is printed onto the frame material 28 along the edge region, for example. The material, in particular the adhesive, is preferably printed onto the frame material 28 with a thickness of less than 100 μm (micrometers).

The invention claimed is:

1. A method for producing a membrane electrode assembly of a fuel cell, wherein the membrane electrode assembly includes an anode, a cathode, and a catalyst-coated polymer electrolyte membrane disposed between the anode and the cathode, comprising the steps of:
    coating a polymer electrolyte membrane with a catalyst material to form the catalyst-coated polymer electrolyte membrane;
    detecting a defective point of a surface of the catalyst-coated polymer electrode membrane;
    conveying the catalyst-coated polymer electrolyte membrane as a continuous material in a conveying direction;
    performing targeted reprinting, by a non-contact printing method, of the catalyst material directly onto a surface of the catalyst-coated polymer electrolyte membrane at the defective point of the surface while the catalyst-coated polymer electrolyte membrane is continuously conveyed in the conveying direction; and
    following the printing, during continuous production of the membrane electrode assembly, dispensing a gas diffusion layer by way of a dispensing module to a printed catalyst-coated polymer electrolyte electrode to produce the membrane electrode assembly.

2. The method according to claim 1, wherein the non-contact printing method is an inkjet printing method.

3. The method according to claim 1, wherein the non-contact printing method is digital printing.

* * * * *